C. H. DUNBRACK.
Fruit-Picker.
No. 221,042. Patented Oct. 28, 1879.
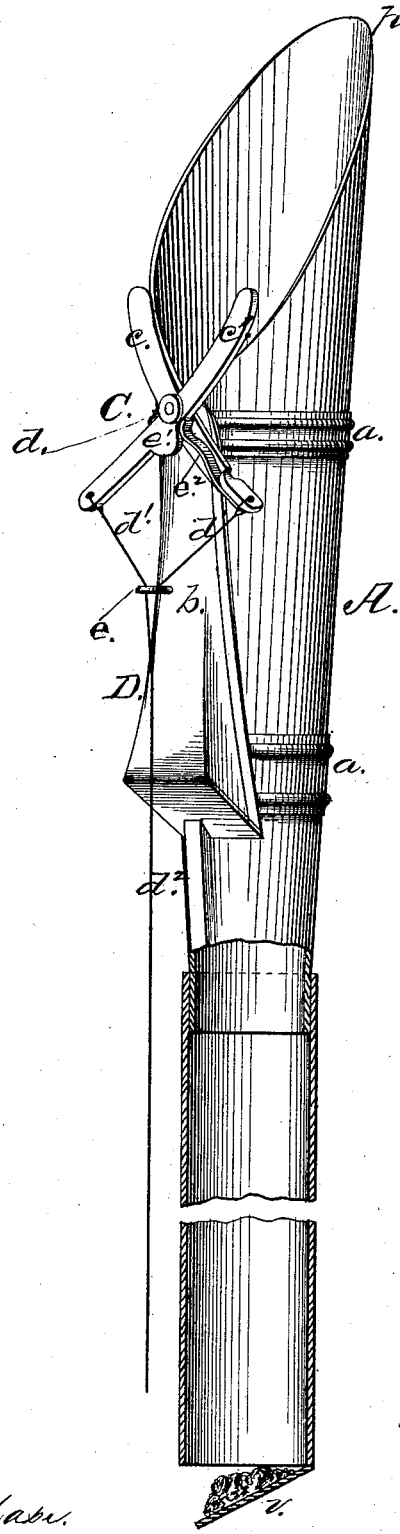

UNITED STATES PATENT OFFICE.

CHARLES H. DUNBRACK, OF JACKSONVILLE, ILLINOIS.

IMPROVEMENT IN FRUIT-PICKERS.

Specification forming part of Letters Patent No. 221,042, dated October 28, 1879; application filed August 9, 1879.

*To all whom it may concern:*

Be it known that I, CHS. H. DUNBRACK, of Jacksonville, in the county of Morgan and State of Illinois, have invented a new and valuable Improvement in Fruit-Pickers; and I do hereby declare that the following is a full, clear, and exact description of the construction and operation of the same, reference being had to the annexed drawing, making a part of this specification, and to the letters and figures of reference marked thereon.

The drawing is a representation of a side view of my improved fruit-picker.

This invention has relation to improvements in devices for picking apples, pears, peaches, plums, and other like fruits; and the nature of the invention consists in the construction and novel arrangement of parts, as hereinafter shown and described.

In the annexed drawing, the letter A designates a conduit or tube, made usually of metal and of a number of detachable sections, serving as a pole to reach into the branches of the tree. The upper section of this tube is of conical form, its larger end being upward, and beveled off, so as to form a point, $p$, that may be readily inserted between the branches and limbs of a tree, and directed to the individual fruit selected. The upper end of this tube is designed to be of greater diameter than the fruit, and its slant or bevel is such that the fruit picked out is received entirely within the flaring end of the same, with its stem extending across and beyond the lower end of the said flaring mouth.

D indicates a frame, composed of two or more spaced rings, $a$, connected together by means of bars $b$, and carrying the cutting mechanism. This frame is passed from below upon the trumpet or flaring section of the conduit or pipe, and the rings $a$ fit snugly around it, with the cutter at the lowest point of this section.

The cutter C is composed of two crossed blades, $c$ $c'$, vibrating upon a pivot, $d$, projecting from frame D, the power-arms of which have secured thereto cords $d'$, that, being carried through a guide-loop, $e$, are united in a single cord, $d^2$, by pulling forcibly upon which the cutting ends of said blades are caused to come together after the manner of a pair of shears, and sever the stem of the fruit. The power-arm of blade $c'$ has a cam, $e'$, and that of blade $c$ a spring, $e^2$, resting against the said cam. This spring is attached only at one end, and serves to hold the blades open when not in use or after each operation thereof.

The lowest section of the tube is provided with a valve, $v$, hinged thereto, and provided with a pad or cushion on its upper side, which valve opens as the fruit descends and allows it to escape, the pad or cushion preventing it from being bruised. At times I use a flexible tube, which may be provided with a padded valve, as above described, at its lower end. In this case the upper end of the tube is also beveled and pointed, and is distended by a metallic or other ring, to which are secured a pole or other support and the shear-cutting device above described. The pull-cords in this case will pass through a guide on the pole.

What I claim as new, and desire to secure by Letters Patent, is—

In a fruit-picker, the sectional tube A, having its upper section of conical form, and beveled, as shown, to form the point $p$, in combination with the frame D, cutter C, and cords $d'$ $d^2$, all constructed and arranged to operate as described.

In testimony that I claim the above I have hereunto subscribed my name in the presence of two witnesses.

CHARLES H. DUNBRACK.

Witnesses:
J. C. WIDENHAM,
J. S. HAMBAUGH.